United States Patent [19]

Rugen et al.

[11] 4,294,742
[45] Oct. 13, 1981

[54] PLASTICIZED VINYL RESINS CONTAINING A LINEAR MONO $C_{12}$ALKYL DIPHENYL COMPOUND

[75] Inventors: Donald F. Rugen, Wilmington, Del.; Alan F. Dickason, Delaware, Pa.

[73] Assignee: Sun Oil Company of Pennsylvania, Philadelphia, Pa.

[21] Appl. No.: 140,636

[22] Filed: Apr. 15, 1980

[51] Int. Cl.³ ............................................. C08K 5/01
[52] U.S. Cl. ........................ 260/31.8 H; 260/33.6 UA
[58] Field of Search ................. 260/33.6 UA, 31.8 H

[56] References Cited
U.S. PATENT DOCUMENTS

| | | | |
|---|---|---|---|
| 2,115,524 | 4/1938 | Hochwat et al. | 260/33.6 R |
| 2,172,391 | 9/1939 | Krase | 260/33.6 A |
| 2,450,435 | 10/1948 | McGillicuddy et al. | 260/31.8 H |
| 2,477,717 | 8/1949 | Brandt | 260/31.8 H |
| 2,580,290 | 12/1951 | Fawcett et al. | 260/31.8 H |
| 2,810,769 | 4/1954 | Sanford et al. | 260/671 |
| 2,925,398 | 2/1960 | Coran et al. | 260/33.6 PQ |
| 3,011,990 | 12/1961 | Roh et al. | 260/31.8 H |
| 3,803,072 | 4/1974 | Graham et al. | 260/33.6 UA |
| 4,167,504 | 9/1979 | Davis et al. | 260/33.6 UA |

Primary Examiner—John C. Bleutge
Assistant Examiner—Herbert J. Lilling
Attorney, Agent, or Firm—J. Edward Hess; Donald R. Johnson; Paul Lipsitz

[57] ABSTRACT

A process for plasticizing vinyl resins such as polyvinylchloride (PVC) wherein the plasticizer is a linear alkyl substituted biphenyl having from about six to about twelve carbon atoms in the alkyl group. The invention also embodies PVC containing the plasticizer.

2 Claims, No Drawings

PLASTICIZED VINYL RESINS CONTAINING A LINEAR MONO C₁₂ALKYL DIPHENYL COMPOUND

It is known in the art that alkylated aromatic compounds are useful as plasticizers. For example, U.S. Pat. No. 2,810,769 discloses that monocyclic aromatic hydrocarbons (e.g. benzenes) may be alkylated with a scission-susceptible olefin to give tertiary-alkylated products which have utility as plasticizers. U.S. Pat. No. 3,803,072 discloses as plasticizers for ethylene/vinylchloride/acrylamide interpolymers, alkylated biphenyls such as isopropyl and di-isopropylbiphenyl. Recently issued U.S. Pat. No. 4,167,504 discloses mono- and dicyclohexylbiphenyls as polyvinylchloride (PVC) plasticizers.

It has now been found that certain specific alkylated biphenyl compounds are good plasticizers and have exceedingly good properties, particularly with respect to one or more properties of low volatility, low temperature flexibility and U.V. stability. In accord with the invention a vinyl resin such as polyvinylchloride is plasticized with a plasticizing amount of an alkylbiphenyl compound where the alkyl group is linear (i.e. normal, unbranched) and contains from about 6 to about 12 carbon atoms.

The diphenyl compounds useful in the process of the invention may be polysubstituted; e.g. they may be mono-, di- or tri-substituted; i.e. they may be mono-alkyldiphenyl, di-alkyldiphenyl and tri-alkyl compounds, although the mono-alkyl diphenyls are preferred as the polyalkyl diphenyls may in some cases and at higher concentrations cause bleeding. It is also to be understood that although these plasticizers may be used in certain cases as the only PVC plasticizer present, they will more commonly be used in conjunction with another primary plasticizer such as dioctylphthalate (DOP).

In recent years, the price per pound of plasticizers has risen higher than the price of PVC resin. This cost relationship has created a major incentive for the PVC formulator to find ways to lower the overall cost of plasticizers used per pound of finished product. The formulator has only a very limited number of options, however, since if he attempts to lower this cost by excessive use of inexpensive fillers or diluents, he will degrade the physical properties below industry standards for specific products with very predictable results. Thus, the formulator needs to be highly knowledgeable about the exact type and amount of plasticizer needed to meet product specifications and to use a blend of apthalate or other ester and another plasticizer which will produce a satisfactory product with lower overall cost. Preferably, of course, the secondary plasticizer should be a material cheaper than the primary and when blended should not adversely affect the physical properties of the finished product. The process of this invention enables these objectives to be met.

The linear $C_6$ to $C_{12}$ alkyl biphenyls used in the invention are known compounds prepared by the alkylation of biphenyl with the appropriate α-olefin using a catalyst such as aluminum chloride (see U.S. Pat. No. 2,244,512 and Brennstoff-Chemie, Nr. 9, Bd. 40, p. 281, 1959). The compounds are incorporated in the PVC to be plasticized in the normal manner in plasticizing amounts usually between about 20 to 70 parts of plasticizer per 100 parts of resin. When a primary plasticizer such as DOP is replaced in part with the alkylated biphenyl compounds, an amount of up to about 30 to 40 parts, preferably up to about 25 parts per 100 parts of resin will be used. At the higher levels some bleeding out may be observed in certain formulations.

As indicated, the plasticized resin will have highly desirable properties such as low volatility, low temperature flexibility and the like. The following examples as detailed by Table I will illustrate the invention.

TABLE I
EVALUATION OF PLASTICIZERS

|  | PHR | $C_{12}$-Diphenyl + DOP | Isopropyl Biphenyl + DOP | DOP |
|---|---|---|---|---|
| PVC FORMULATION |  |  |  |  |
| PVC GEON 102 | 100 |  |  |  |
| Stearic Acid | 0.6 |  |  |  |
| Epoxidized Stabilizer | 7.0 |  |  |  |
| DOP |  | 30 | 30 | 50 |
| Plasticizer Added (PHR) |  | 20 | 20 | — |
| Millability |  | Good | Good | Good |
| Compatability |  | OK | OK | OK |
| INITIAL |  |  |  |  |
| Tensile, psi |  | 2350 | 2750 | 2400 |
| Elongation, % |  | 325 | 350 | 325 |
| Modulus, S-100 |  | 1375 | 1500 | 1225 |
| 200 |  | 1875 | 2175 | 1850 |
| 300 |  | 2300 | 2625 | 2300 |
| Hardness, Shore A |  | 92 | 94 | 89 |
| AGED - 48 HRS. 212° F. |  |  |  |  |
| Tensile, psi |  | 2400 | 2350 | 2250 |
| Elongation, % |  | 325 | 150 | 325 |
| Modulus, S-100 |  | 1200 | 1900 | 1200 |
| 300 |  | 1950 | — | 1850 |
| 300 |  | 2350 | — | 2175 |
| Hardness, Shore A |  | 90 | 96 | 86 |
| Volatility 48 HRS. 212° F. |  | −2.4 | −6.7 | −0.84 |
| EXTRACTABLES |  |  |  |  |
| Water, 48 HRS. 200° F. |  | +0.50 | +0.41 | +0.50 |
| Kerosene, 48 HRS. RT |  | −6.8 | +2.8 | +3.3 |
| Gehman T 100° F. |  | −32.2 | −14.8 | −20.2 |
| UV STABILITY D-1500 |  |  |  |  |
| Initial |  | 0.5 | <0.5 | 0.5 |
| Aged |  | 0.5 | 1.5 | 0.5 |

It is clear from the Table that the $C_{12}$-diphenyl used in the PVC results in a plasticized PVC which, except for slightly higher volatility, is essentially equivalent to DOP alone and significantly better than isopropylbiphenyl. Thus, the $C_{12}$-diphenyl may be added to DOP to reduce costs and still give a suitably plasticized PVC.

In similar experiments with di-n-hexylbiphenyl, n-octylbiphenyl and n-decylbiphenyl at various levels in combination with DOP, the results obtained showed that these compounds were useful as secondary plasticizers and imparted to the resin excellent low temperature properties.

The invention claimed is:

1. A plasticized polyvinylchloride resin containing a primary plasticizer and as a secondary plasticizer a linear mono-alkyl diphenyl wherein said alkyl group contains 12 carbon atoms.

2. Plasticized polyvinylchloride containing dioctylphthalate as a primary plasticizer and as a secondary plasticizer a linear mono-alkyl diphenyl having 12 carbon atoms in the alkyl group.

* * * * *